United States Patent [19]

Dunn et al.

[11] Patent Number: 4,528,013

[45] Date of Patent: Jul. 9, 1985

[54] MELTING FURNACES

[75] Inventors: Charles S. Dunn, Pataskala; Mark A. Propster; Charles M. Hohman, both of Granville, all of Ohio

[73] Assignee: Owens-Corning Fiberglas Corporation, Toledo, Ohio

[21] Appl. No.: 512,067

[22] Filed: Jul. 11, 1983

Related U.S. Application Data

[63] Continuation-in-part of Ser. No. 405,851, Aug. 6, 1982, abandoned.

[51] Int. Cl.³ .............................................. C03B 5/033
[52] U.S. Cl. ........................................ 65/136; 65/128; 65/137; 65/337; 65/347
[58] Field of Search .................. 65/128, 136, 137, 337, 65/347

[56] References Cited

U.S. PATENT DOCUMENTS

| | | | |
|---|---|---|---|
| 1,059,634 | 4/1913 | Proeger . | |
| 1,761,342 | 6/1930 | Hitner . | |
| 2,000,278 | 5/1935 | Ferguson | 13/6 |
| 2,018,884 | 10/1935 | Ferguson | 13/6 |
| 2,276,295 | 3/1942 | Ferguson | 13/6 |
| 2,413,037 | 12/1946 | De Voe . | |
| 2,490,339 | 12/1949 | De Voe | 13/6 |
| 2,523,030 | 9/1950 | Labino | 13/6 |
| 2,591,708 | 4/1952 | Lubatti | 13/6 |
| 2,600,490 | 6/1952 | De Voe | 13/34 |
| 2,863,932 | 12/1958 | Gell et al. | 13/6 |
| 2,899,476 | 8/1959 | Gell | 13/6 |
| 2,919,297 | 12/1959 | Augsburger | 13/6 |
| 2,951,316 | 9/1960 | Slayter | 65/122 |
| 2,993,079 | 7/1961 | Augsburger | 65/347 X |
| 3,246,124 | 4/1966 | Trethewey . | |
| 3,264,076 | 8/1966 | Veazie et al. | 65/2 |
| 3,326,655 | 6/1967 | Penberthy . | |
| 3,395,237 | 7/1968 | Orton | 13/6 |
| 3,527,590 | 9/1970 | Goto et al. . | |
| 3,583,861 | 6/1971 | Preston | 65/135 |
| 3,628,930 | 12/1971 | Harris | 65/136 X |
| 3,649,231 | 3/1972 | Trethewey | 65/2 |
| 3,683,093 | 8/1972 | Gell et al. | 13/6 |
| 3,725,558 | 4/1973 | t'Serstevens | 13/6 |
| 3,757,020 | 9/1973 | Steitz et al. | 13/6 |
| 3,836,689 | 9/1974 | Holler et al. | 13/6 |
| 3,912,477 | 10/1975 | Brady et al. . | |
| 3,942,968 | 3/1976 | Pieper . | |
| 3,983,309 | 9/1976 | Faulkner et al. | 13/6 |
| 3,997,316 | 12/1976 | Koontz . | |
| 4,143,232 | 3/1979 | Bansal et al. | 13/16 |
| 4,194,077 | 3/1980 | Canfield et al. | 13/6 |
| 4,211,887 | 7/1980 | Williamson | 13/6 |
| 4,246,433 | 1/1981 | Seifried et al. | 13/6 |
| 4,323,383 | 4/1982 | Sims . | |
| 4,365,986 | 12/1982 | Nayak | 65/128 |

Primary Examiner—Arthur Kellogg
Attorney, Agent, or Firm—Ronald C. Hudgens; Patrick P. Pacella; Hiram P. Settle

[57] ABSTRACT

A melting furnace is disclosed which heats by joule effect to supply molten material of uniform temperature at the floor of the melter. During formation of molten material, an essentially isothermal condition across a given horizontal plane of the body of molten material is established. Spaced apart opposed electrodes and controlled current flow establish these uniform temperatures and allow molten material to be formed directly from the melter without further processing.

10 Claims, 11 Drawing Figures

MELTING FURNACES

RELATED APPLICATIONS

This application is a continuation-in-part of our earlier application entitled "Melting Furnaces", Ser. No. 405,851, now abandoned, filed in the U.S. Patent and Trademark Office on Aug. 6, 1982, and assigned to the assignee of this invention.

TECHNICAL FIELD

This invention relates to the production of molten material and, more particularly, to a vertical melter for the making of molten glass by electric melting techniques.

BACKGROUND ART

In the typical large horizontal glass furnace for continuous manufacture, the glass undergoes the stages of being prepared by melting batch materials, which float on the molten glass at one end of the furnace, fining the molten glass in a succeeding zone, which in certain cases may be isolated from the first zone by a wall, and conditioning, quieting and cooling the molten glass to a temperature suitable for manufacture into glass products in a conditioning or working zone, which may also be substantially isolated. These furnaces may be gas fired or electric melt furnaces.

A common system for producing glass filaments or fibers includes a furnace having forehearths extending therefrom through which molten glass in the furnace is carried to a plurality of spaced apart bushings or other devices, such as spinners, located along the bottom wall of the forehearths. The forehearths can extend directly from the furnace or can extend as branches from one or more main channels carrying the molten glass from the furnace. The glass from each forehearth flows through openings by gravity into the bushings therebelow with molten glass streams from the bushings or spinners being formed into glass filaments or fibers.

Vertical melters are known which permit glass to be formed directly from a furnace or melting region. To accomplish this, one type of arrangement uses a strip or screen of platinum or platinum alloy disposed in the furnace region. The platinum typically is perforated or slotted to facilitate circulation of molten glass. Electric current is passed through the strip or screen to melt the raw batch by resistive heating of the screen. A forming means, such as a bushing, is connected directly to the melter to provide streams of molten glass that are formed into fibers by various means.

DISCLOSURE OF INVENTION

We have developed a joule effect electric melter aimed primarily at processes where consistency in properties like temperature and viscosity in a supply of molten material, such as molten glass, are important in forming a quality product. The melter is a shallow vertical melter that supplies molten material of uniform temperature to one or more product forming outlets located at the bottom of the melter. During operation, the melter establishes within the molten material of the melter a horizontal heating zone of substantially uniform temperature condition throughout.

When melting glass according to the principles of the invention from a layer of raw batch formed on the surface of the molten body, molten glass in the melter rises to the molten glass/raw batch interface as a result of thermal currents caused by the heating zone. Molten glass moves across the upper surface of the molten body where it can easily degas. The thermal currents effect mixing and fining of the glass in such a way to promote uniform temperature of the molten glass in horizontal layers throughout the molten body. The result is a supply of glass of desired uniform temperature delivered at the entrance to the melter outlets.

The zone of the uniformly heated material is established in preferred form by operation of joule effect electrodes arranged according to the invention in generally opposed spaced apart relationship. In a more specific sense, the electrodes are disposed in two groups, each in generally horizontal and laterally spaced apart relationship; the electrodes in each group are also arranged in opposed space apart relation. Means for supplying electrical current to the electrodes matches electrical current in each electrode with the particular spaced apart relationship of the electrodes to form the heating zone of substantially uniform temperature and thereby mix and move the molten glass to supply glass of uniform temperature to the entrance outlets of the melter.

BEST MODES OF CARRYING OUT INVENTION

Figure 1:
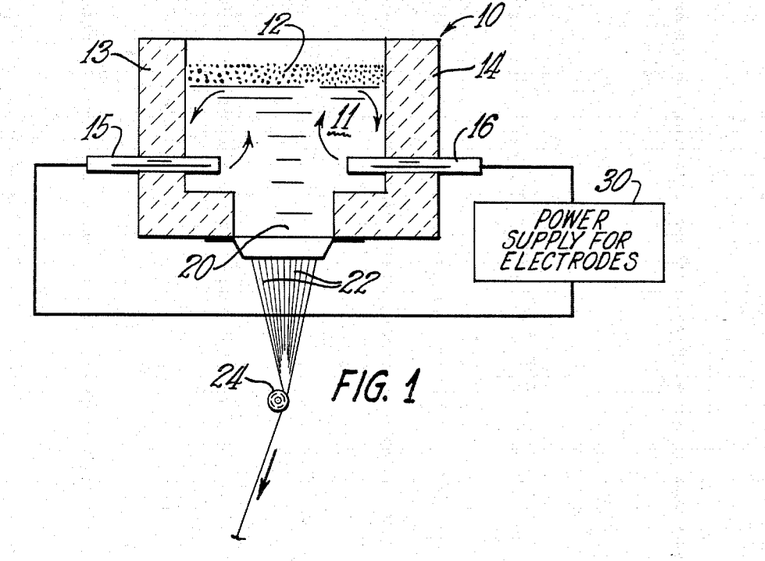
FIG. 1 is a plane elevational view of a glass melting furnace and fiber forming apparatus utilizing the present invention.
Figure 2:
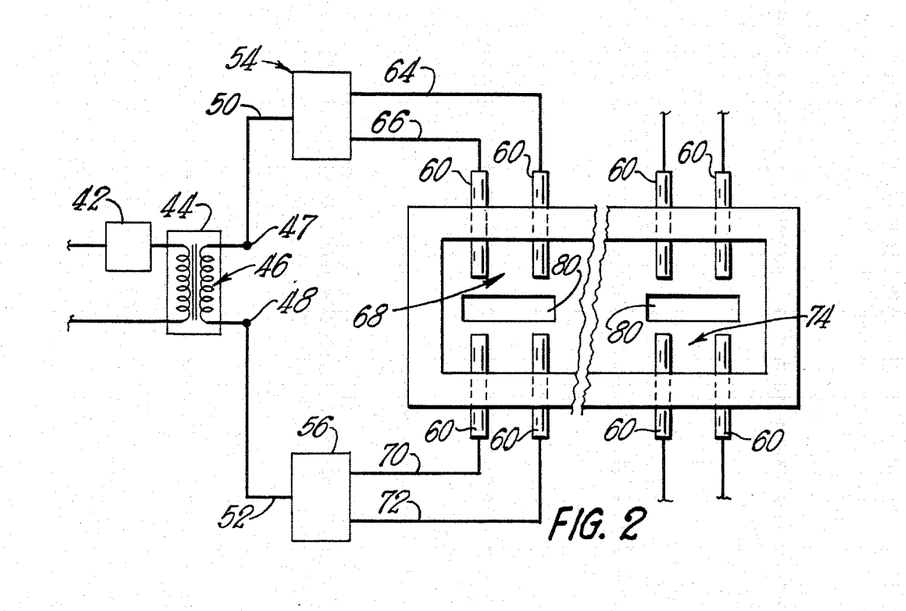
FIG. 2 illustrates a schematic of one embodiment of this invention using equalized current flow through the individual electrodes.

The Embodiments of FIGS. 1 and 2

We will conveniently describe this invention by the structure disclosed in FIGS. 1 and 2. While this invention has been illustrated by this structure, it also may take a variety of other forms.

As shown in FIG. 1, the melter is made of refractory 10 and holds a body of molten glass 11 covered by a blanket 12 of pulverant raw glass batch material. The raw batch material may be for wool glass, textile glass, bottle glass, flat glass, or basalt or the like. Extending through side walls 13 and 14 is at least one pair of opposed, movable electrodes 15 and 16. The sides and bottom of the melter are made from a suitable refractory material which can withstand the high temperature attendant with the melting of glass. The individual electrodes 15 and 16 are molybdenum. It should be understood that the embodiment of FIG. 1 is not limited to the use of two electrodes and that any number of electrodes greater than two may be used.

The spaced apart opposed electrodes located within the vessel and the means for controllably supplying electrical current to each of the opposed electrodes cause electrical current to flow between them through the molten material to cause heating thereof by joule effect. The placement of the electrodes relative to each other and the interior surfaces of the melter, and the means for controllably supplying electrical current to each electrode, is effective during formation of an isothermal heating zone. This zone promotes essentially isothermal conditions across given horizontal planes of the body of molten material and effects molten glass of uniform temperature at the exit openings of the melter.

Any type of forming apparatus may be employed with melter 10 such as a bottle machine or spinner for producing insulation. Shown is a textile type fiber forming bushing 20 mounted in the bottom of melter 10. Glass fibers 22 may be pulled by a winder or other suitable mechanism not illustrated. The fibers 22 are gathered into a strand by a gathering shoe 24.

The fiber forming bushing 20 may be a foraminous plate having a plurality of apertures which are sized to draw glass fibers of the desired denier. The combination of heating produced by joule effect in the vicinity of the interface of the individual electrodes 15 and 16 within the molten glass 11 produces the isothermal conditions within the vessel to permit the fibers to be drawn without requiring further processing to produce temperatures which permit glass fiber drawing.

One arrangement that can be employed to achieve melting and glass delivery according to the invention uses the dimension between opposed electrode tips. This dimension is generally in the range of two inches to eighteen inches, and preferably three to twelve inches. More preferably, this dimension is four to eight inches.

While the temperature in a given zone or plane may vary somewhat, we generally found the temperaturre of a given plane or vary no more than 50° F., preferably no more than 25° F.

The dimensions between electrodes and between electrodes and forming means establish a circulation pattern above the electrodes with the coolest molten glass in the melter, i.e., the molten glass near the floor, flowing to the forming means. Generally, the electrodes closest to the floor of the melter are 2 to 12 inches from the floor. Preferably, this distance is 2 to 6 inches from the floor.

Electrodes need not pass through the side walls of furnace 10, but instead may enter the molten glass from above its top surface. Accordingly, a portion of each electrode is submerged in molten glass 11, and a portion of each electrode is exposed to the environment adjacent the raw batch/molten glass interface. Means must be located at this interface for preventing oxidation of the electrode. Typically, a cooling means such as a cooling jacket with circulating nitrogen or water provides the needed protection. Generally, top-entering electrodes will be constructed in a knee/ankle configuration employing two elbows so that the portion of electrodes 16 submerged below molten glass 11 where penetration into the center of furnace 10 from the side walls still can be varied. This is the preferred design when a high resistivity glass and a low resistivity refractory are employed. Thus, pairs of electrodes 16 can still be moved towards or away from each other depending on furnace conditions.

FIG. 2 illustrates a schematic of another embodiment of the present invention which uses the combination of two arrays of electrodes disposed within the glass to heat molten glass to a sufficiently uniform temperature to permit glass fibers to be drawn directly from the bottom of the furnace through a textile type bushing.

FIG. 2 also illustrates an electrical schematic of the power supply 30 illustrated in FIG. 1. The power supply 30 includes a resistance heating power supply 44 which is comprised of a transformer 46 having secondary terminals 47 and 48 which are respectively coupled to the center taps 50 and 52 of first and second arrays of inductors 54 and 56 and to equalize the current flowing to individual electrodes 60. The ends 64 and 66 of each of the first array of center tapped inductors 54 are coupled to a different individual electrode 60 within array 68 so that each electrode is coupled to only a single end of one of the inductors within the array. The ends 70 and 72 of each of second array of center tapped inductors 56 are coupled to a different individual electrode 60 within array 74 so that each electrode is coupled to only a single end of one of the inductors within the array. An SCR 42 is provided in the input to transformer 46 of the resistance heating power supply 44 to permit control of the amount of current being drawn by electrodes 60 for resistance heating within the arrays 68 and 74 by adjusting the firing current of the SCR. It should be understood that the number of electrodes 60 and associated current splitting inductors 54 and 56 illustrated were chosen for purposes of illustration and does not signify the limitation of the invention. For additional electrodes 60, which are added to the arrays 68 and 74, additional current splitting inductors must be added to the arrays 54 and 56 such that the current fed to each electrode 60 is equal. Stable energizing circuits for the electrodes 15, 16, 60 are similar to those described in FIG. 2.

FIG. 2 also demonstrates that multiple bushings may be utilized on a single melter. Multiple openings 80 in the floor for discharge of molten material are shown as are additional electrodes 60 in arrays 68 and 74.

The electrode power supply circuits of FIG. 2 each equalize the flow of current through the individual electrodes disposed within the molten glass. The equalization of the flow of current in each electrode within the glass is produced by applying electrical power for driving either the electrodes directly or indirectly through additional cascaded current splitting inductors through the center tap of an inductor having ends which are respectively coupled either directly to electrodes or to the center taps of the additional cascaded current splitting inductors. When the current being drawn by one of the electrodes increases without a concomitant increase in current in the other electrode or circuit branch within the array, the magnetic flux in the half of the inductor between the center tap and the point of the connection having increased current flow increases which induces an opposing EMF in the inductor in accordance with Lenz's law of magentic induction. This induced EMF opposes the increase in the current flowing in the electrode having the increased flow and causes an increase of current flow in the other half of the inductor which tends to equalize the current flowing in both circuits coupled to the ends of the inductor. Similarly, the current splitting inductor equalizes the flow of current in each of the arrays. An array of electrodes n where $n=(2)^x$, and x equals 1 to infinity, can be constructed by cascading current splitting inductors where the ampere turns on each side of the center tap are equal. For all other arrays of electrodes where n does not fall in the group $n=(2)^x$, the current splitting inductors must be configured such that the ampere turns on each side of the center tap are not equal but are such that the electrodes in the array have the flow of current equalized.

Figure 3:
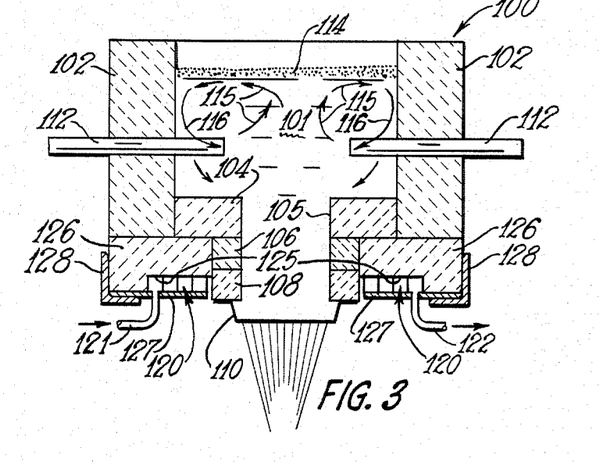
FIG. 3 is a vertical sectional view, with parts shown in elevation, similar to FIG. 1, but illustrating a different form of the present invention capable of carrying out the method of the present invention.

The Embodiment of FIG. 3

In that version of the invention shown and illustrated in FIG. 3 of the drawings, the furnace is quite similar in its construction and design to the embodiment of FIGS. 1 and 2.

Generally, the embodiment of the furnace 100 includes side walls 102 and end walls (not shown) positioned above a bottom wall 104 and cooperating therewith to confine a body of molten glass 101. The end walls (not shown) were lined with an erosion-resistant chromic oxide refractory which was water-cooled to increase its electrical resistivity, as disclosed in the pending application of Charles S. Dunn, Ser. No. 512,854, filed in the U.S. Patent and Trademark Office on July 10, 1983. The minimal cooling of the end walls did not materially affect the heat flow pattern within the molten glass in the furnace of FIG. 3. The bottom wall 104 is provided with a discharge opening 105 located centrally thereof for conveying glass from the molten body 101 to a lower glass fiber-forming bushing 110. Interposed between the bottom wall 104 and the bushing 110 are a pair of bushing blocks 106 and 108 having apertures registering with the discharge opening 105 of the bottom wall 104.

Projecting through the side walls 102 are electrically energizable electrodes 112 similar to the electrodes 15, 16 and 60 of the previously-described embodiments of FIGS. 1 and 2 and energized by power means similar to that illustrated in FIG. 2 of the drawings. The electrodes 112 are immersed in the body 101 of molten glass intermediate the bottom wall 104 and a layer of blanket of particulate, solid glass batch 112 superimposed on the molten body 101.

When the multiple electrodes 112 are energized electrically, the molten glass in the body or pool 101 is heated, primarily at the inner ends or "tips" of the electrodes and in the space intermediate the electrodes, so that the heated glass is thermally circulated upwardly from the electrode tips, indicated generally by the directional arrows 115. The upwardly flowing heated molten glass flows to and across the undersurface of the batch blanket 114 to melt the batch blanket as hereinbefore explained. The molten glass thus flows upwardly from the electrode tips generally horizontally and outwardly along the undersurface of the batch blanket to carry out this melting function.

The heated molten glass primarily returns to the electrode tips for reheating and recirculation, the glass generally flowing downwardly along the side walls 102 and confined by the end walls (not shown). This recirculation to the electrode tips is indicated by the directional arrows bearing the reference numerals 116. A minor portion of the circulating heated glass flows downwardly past the electrodes 112 to that portion of the body or pool 101 of molten glass beneath the electrodes for eventual flow downwardly through the outlet passage 105 in the bottom wall 104, the central apertures of the bushing blocks 106, 108, and then into the bushing 110 for processing therein into glass fibers.

From observation of the furnace in operation and from actual temperature measurements taken within the body of molten glass 101 as reported in Examples I through V hereof, it has been found that the highest temperature within the body of molten glass 101 occurs at or above the level of the electrodes 112; that this hottest portion of the pool of molten glass rises generally vertically from the electrode tips in the area intermediate the electrodes against the undersurface of the batch blanket and then travels laterally outwardly beneath the batch blanket to both melt the batch and to dispose of "seeds" or entrapped gas bubbles through the relatively thin batch blanket layer which may range in thickness from about $\frac{1}{2}''$ to $1\frac{1}{2}''$; that any heat losses through the batch blanket are quickly compensated for by the flow of additional hot glass upwardly from the electrodes; that the hottest glass is effective to melt the batch blanket, with such melting being increased in efficiency by the lateral travel of the heated glass from the medial vertical portions of the pool of glass 101 laterally outwardly; that the majority of the molten glass at its highest elevated temperature is recirculated back to the electrode tips for reheating and for utilization in subsequent melting of additional batch; that the amount of glass which downwardly flows past the electrodes to that region of the pool 101 beneath the electrodes is substantially equal to the amount of glass withdrawn from the pool 101 through the aperture 105 for flow to the forming apparatus 110; that the molten glass generally beneath the level of the electrodes 112 flows through successive, horizontal, substantially isothermal planes downwardly through the lower portions of the pool 101 and through the opening 105 and the bushing block 106, 108; and that the glass becomes progressively cooler as it flows downwardly in the substantially isothermal planes toward and through the outlet opening 105 and the bushing blocks, so that all of the glass is conditioned for entry into the forming apparatus 110 at a temperature approaching the desired operating temperature at the forming apparatus 110. These melting conditions are common to all three versions of the invention herein disclosed.

In the manufacture of glass products, including the manufacture of fiberglass products, the molten glass inevitably contains "seeds" or minute gas bubbles entrapped within the molten glass and carried into the final product. Generally, such seeds are removed by "fining" the glass, i.e., by holding the glass in a virtually stagnant or slowly moving pool for an extended period of time until the seeds are removed by this upward travel through the glass body to the surface of the body. The "seed count" of the molten glass is determined by counting the number of seeds per cubic inch of glass. Seed counts on the order of 100 are fairly common where bubblers are not used in the melting process. Where bubblers are used, initial seed counts on the order of 1200 to 1500 are not unusual.

By the practice of the present invention, low seed counts are obtained. In the operation of a furnace as illustrated in FIG. 3, and operated as set forth in Example I hereof, seed counts ranging from 0 to 52 seeds per cubic inch were obtained, and an average seed count of 28 per cubic inch resulted over an extended period of operation. This low seed count apparently results from the mobility of the hottest glass at and above the electrode location, the upward travel of the hottest glass to and along the undersurface of the batch blanket, and the escape of the seed-forming gas bubbles through the thin batch layer as the hottest glass recirculates at and above the electrode location, even though the molten glass is not "fined" in the conventional sense of holding it virtually stagnant for an extended period of time.

The embodiment of FIG. 3 differs from the embodiments of FIGS. 1 and 2 primarily in the improved conditioning to the desired forming temperature by means of a heat exchanger operative to cool the molten glass in the lower regions of the pool 101 and as it flows through the outlet aperture 105 and the bushing blocks 106 and 108. In FIG. 3, this heat exchange means is illustrated as a water jacket 120 which is of conventional design to provide a labyrinthian passage for a heat exchange medium, preferably cool water, which is circulated through the water jacket 120, the heat exchange fluid entering the water jacket through an inlet line 121 and exiting through an outlet 122. The water jacket 120 is inserted into and retained within an appropriately shaped recess 125 formed in a refractory bottom element 126, with the element 126 and the heat exchanger being held in place by a bottom support plate 127 and angle from supports 128.

Figure 7:
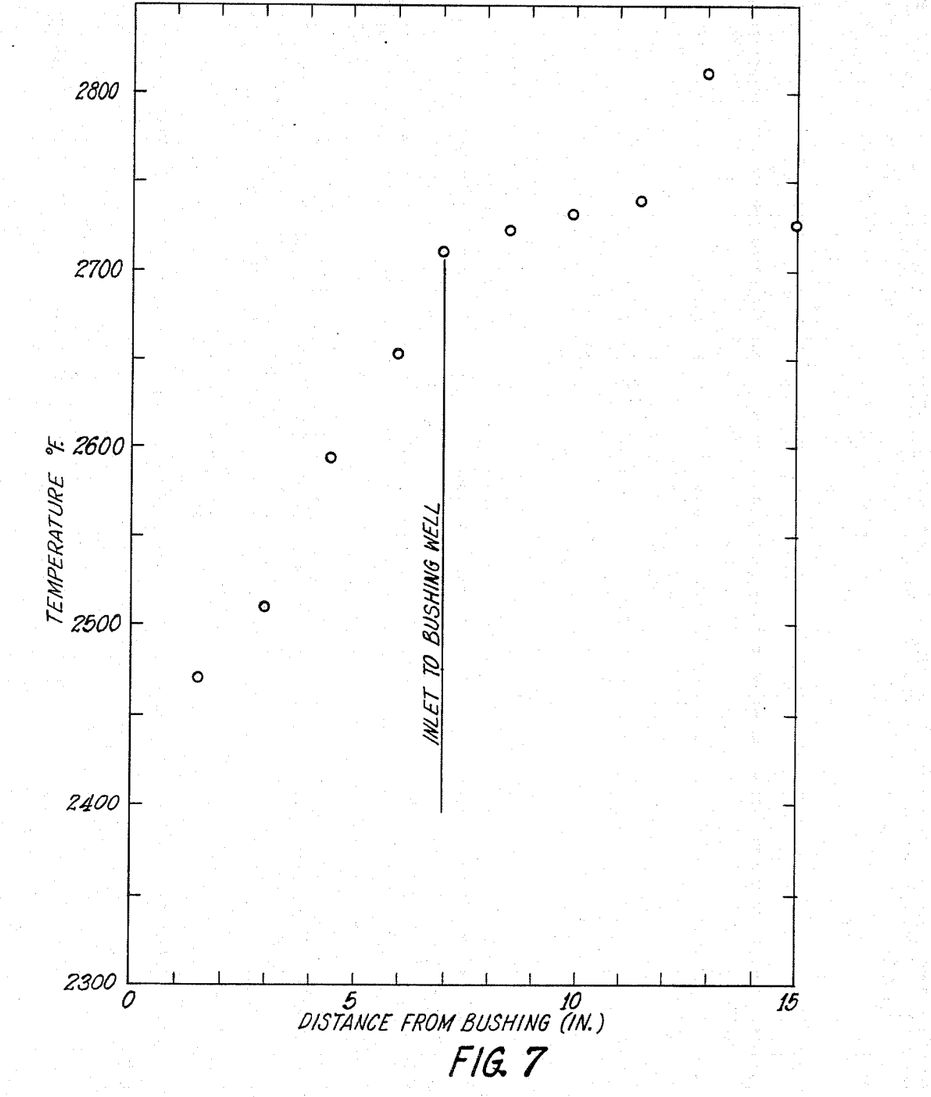
FIG. 7 is a diagram showing the temperature relationship of temperature determinations taken along a medial vertical axis of a furnace constructed in accordance with FIG. 3.
Figure 8:
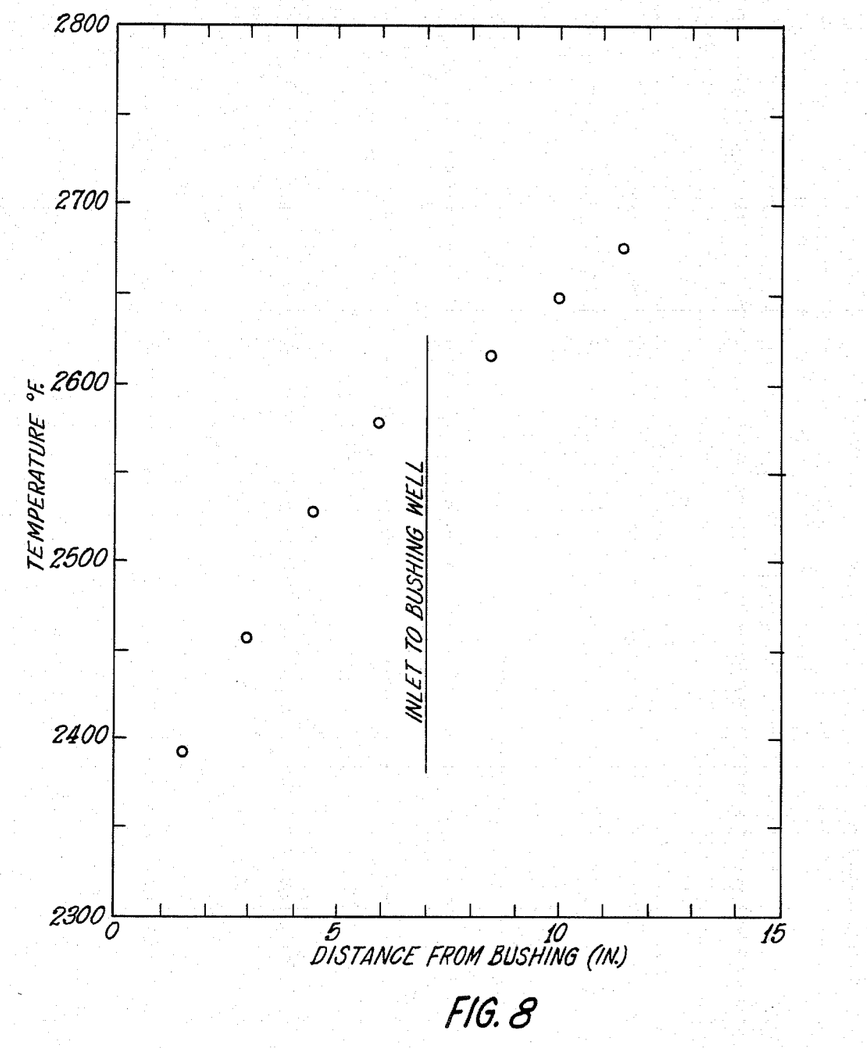
FIG. 8 is a diagram similar to FIG. 7 but utilizing different operating conditions.

This specific location and arrangement of the heat exchanger 120 is such that the flow of heat exchange fluid therethrough cools the furance bottom wall 104, the outlet passage 105, and the bushing blocks 106 and 108. By the provision of the heat exchanger 120 in heat exchange relation to the bottom of the furnace and the outlet therefrom, heat is extracted from the molten glass in the bottom regions of the pool 101 and from that portion of the pool of glass 101 flowing through the bottom outlet and the bushing blocks interposed between the bottom outlet and the forming apparatus 110. The cooling effect of the heat exchange means 120 is illustrated in FIGS. 7 and 8 wherein the rapid cooling of molten glass in the bushing well 105 and the bushing blocks 106 and 108 will be readily apparent. This same relatively rapid cooling is illustrated in FIG. 8 of the drawings. The temperature profile of FIG. 10 of the drawings illustrates both the rapid cooling of the glass and the fact that it is cooled in essentially isothermal planes, particularly in the bushing well and the bushing blocks, so that the glass entering the forming apparatus 110 is both (1) at a reduced temperature conducive to forming and (2) at a uniform temperature across substantially the entire body of glass flowing into the forming apparatus from the lower bushing block 108.

Figure 10:
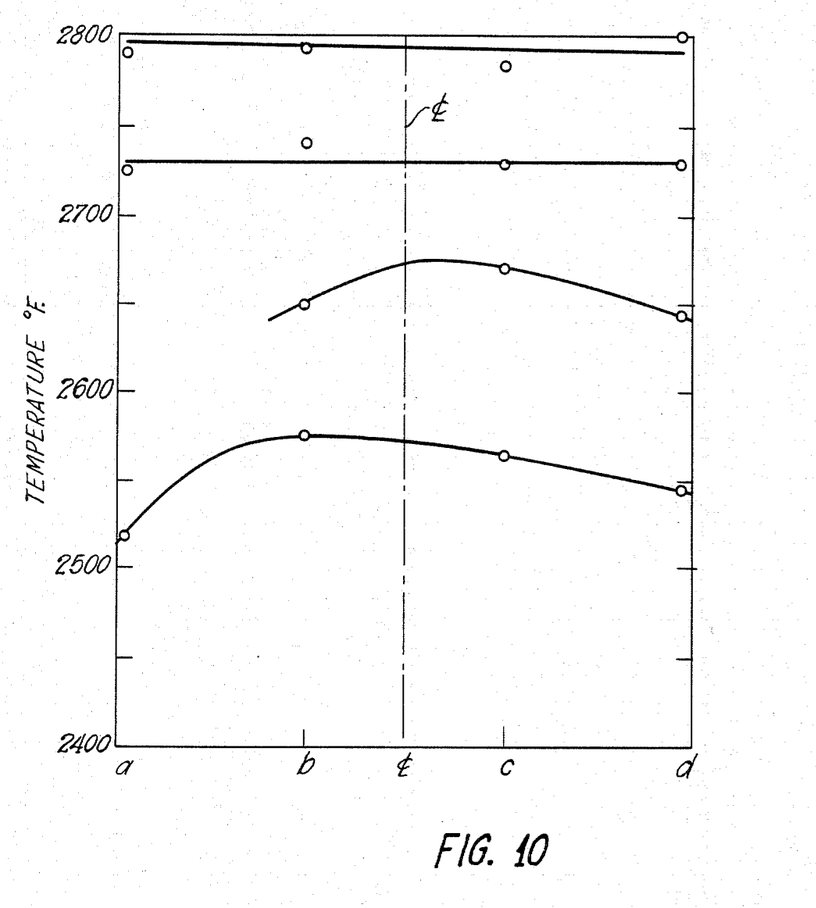
FIG. 10 is a diagram in which the temperature determinations made in accordance with FIG. 9 are plotted against the thermocouple locations of FIG. 9.

From FIG. 10, it will also be observed that the coolest glass exists at the marginal walls of the apertures of the bushing blocks 106, 108 and the bushing well 105. This is to be expected, since heat extraction will occur due to contact of the glass with the cooled side walls. However, it is surprising that the temperature profile across the passage through the bushing well and the bushing blocks is so uniform. This temperature profile prevents any "channeling" of hot glass down the centerline of the furnace directly into the forming apparatus.

Figure 11:
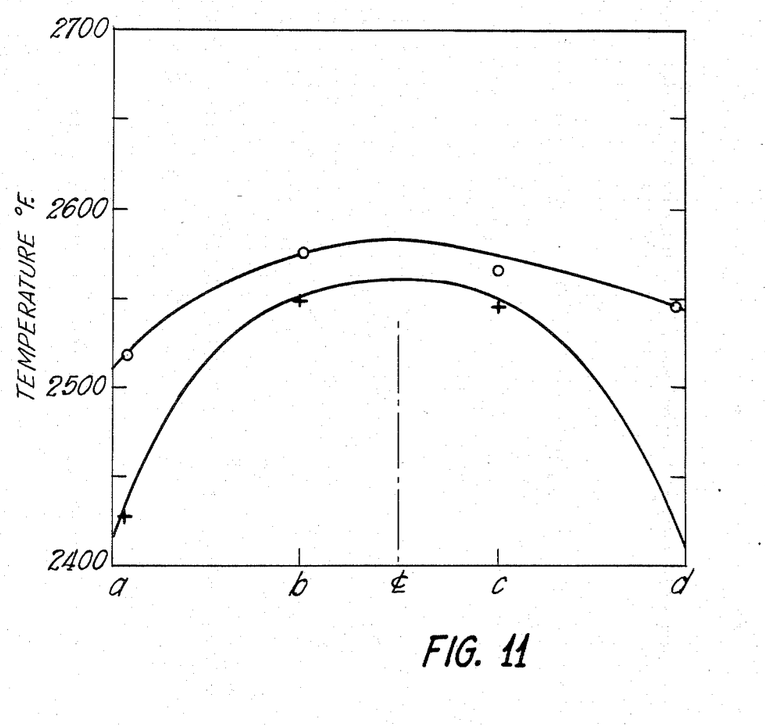
FIG. 11 is a diagram similar to FIG. 10 but wherein the operating conditions were varied.

It is necessary, however, that the amount of cooling exerted by the heat exchanger 102 be utilized judiciously. As illustrated in the chart of FIG. 11, an increase in the amount of cooling exerted by the heat exchanger 120 may result in an increased temperature differential across the body of glass flowing through the bushing blocks and entering the bushing without appreciably increasing the chilling of the center portion of the glass flowing therethrough. As illustrated in FIG. 11, an increase in the flow of cool water through the heat exchanger 120 reduced the temperature at the center of the bushing block by less than 25° F. while reducing the temperature at the interface of the bushing block and the molten glass by from about 75° F. to more than about 110° F. Thus, over-cooling by utilization of the heat exchanger 120 merely creates an increased temperature differential internally of the glass without materially reducing the overall temperature or the average temperature of the glass.

One other effect of the utilization of the heat exchanger 120, and of substantial importance in the operation of furnaces of the character with which this invention is concerned, resides by utilization of the furnace of FIG. 3 as compared with the furnaces of FIGS. 1 and 2. The limiting capacity factor during operation of the furnace is the capability of the furnace to deliver glass to the forming apparatus 110 at a temperature at which it can be properly utilized in the forming apparatus. This temperature is substantially less than that generated at the hottest portions of the glass body 110, that is the temperature at the glass at and above the level of the electrodes.

By utilizing the heat exchanger 120, a greater quantity of glass can be melted and cooled to the desired forming temperature. Typically, a furnace such as that illustrated in FIGS. 1 and 2 of the drawings can operate at a throughput of about 20 pounds or less per hour for a furnace which has an internal dimension of 18" by 30". By utilizing the heat exchanger 120, that version of the furnace illustrated in FIG. 3 of the drawings and of the same internal dimensions can be operated at average throughputs on the order of 50 pounds per hour while maintaining essentially planar, isothermal flow without "channeling ".

Figure 4:
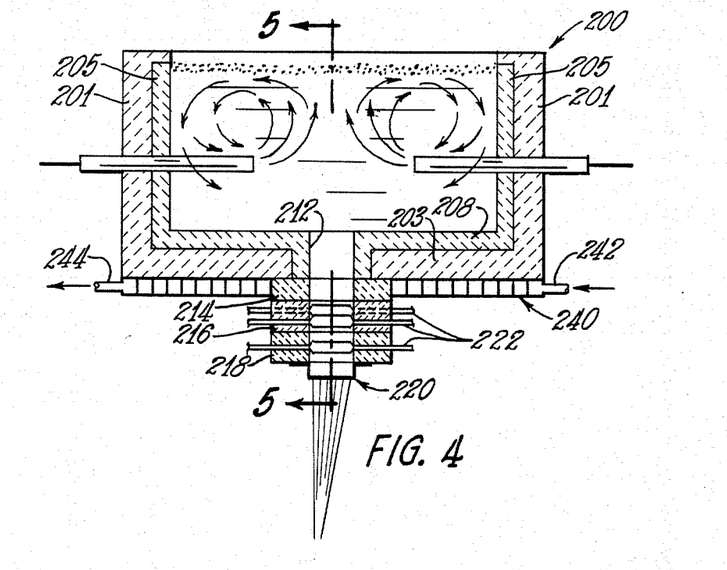
FIG. 4 is a vertical sectional view, with parts shown in elevation, similar to FIGS. 1 and 2, but illustrating a third form of the present invention capable of carrying out the method of the present invention.
Figure 5:
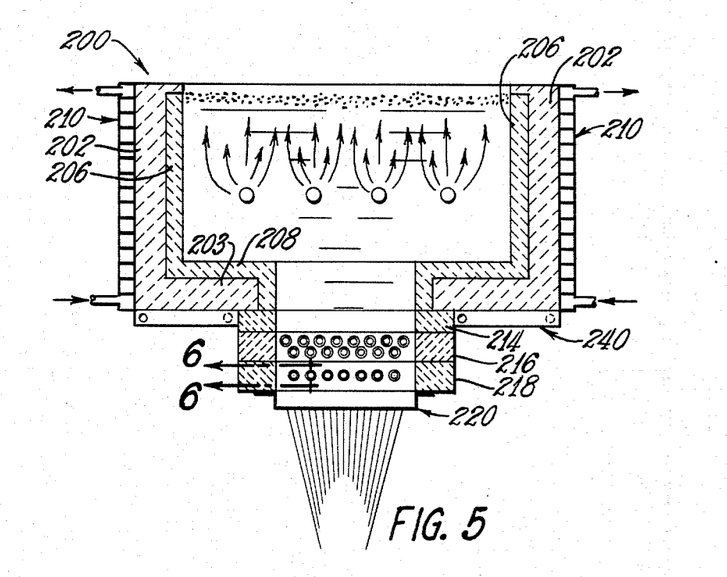
FIG. 5 is a vertical sectional view taken along the plane 5—5 of FIG. 4.
Figure 6:
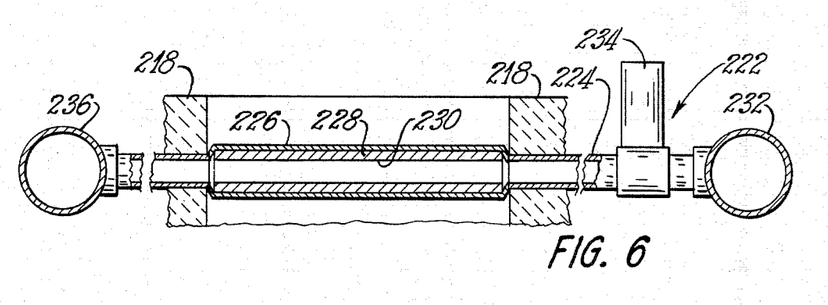
FIG. 6 is an enlarged sectional view, with parts shown in elevation, taken along the plane 6—6 of FIG. 5.

The Embodiment of FIGS. 4 through 6

In that embodiment of the invention illustrated in FIGS. 4 through 6 of the drawings, the furnace 200 generally comprises side walls 201, end walls 202 and a bottom wall 203 of one type of refractory material and a lining for the respective walls and bottom consisting of a different type of refractory. Preferably, the refractory of the walls 201, 202 and 203 are of a conventional sintered zircon-type refractory.

The walls, 200, 201 and 202 and the bottom 203 are lined with an erosion-resistant refractory which is essentially chromic oxide. Suitable refractories of this type are manufactured by The Carborundum Company of Falconer, N.Y. and sold under the tradename "Monofrax E" and by Corhart Refractories of Louisville, Ky. under the tradename "C-1215 Chromic Oxide Refractory." The lining for the walls and the bottom is indicated by reference numerals 205, 206 and 208, respectively. As fully described in the co-pending application of Charles S. Dunn, Ser. No. 512,854, filed July 11, 1983, filed on even date herewith in the U.S. Patent and Trademark Office, and assigned to the assignee of the present invention, the refractory constituting the lining 205, 206 and 208 is of lower electrical resistivity at the operating temperature of the furnace 200 and the end walls 202 are cooled as by heat exchangers 210 (FIG. 5). The end walls only of the furnace of FIG. 3 are similarly lined and cooled.

The composite side and bottom walls confine a body of molten glass 207 heated by electrodes 209, as heretofore explained in connection with FIG. 1. The lower wall 208 is provided with a centrally located outlet aperture or "bushing well" 212 which is also lined and which communicates with a plurality of stacked, centrally apertured bushing blocks 214, 216 and 218 which preferably are of the same sintered zircon refractory as the walls 201, 202 and 203. Secured to the lowermost bushing block 218 is a fiberglass forming bushing or other forming apparatus 220.

The bushing blocks 216 and 218 are provided with heat exchanger means indicated generally at 222 and specifically illustrated in FIG. 6 of the drawings. As shown in FIG. 6 of the drawings, the heat exchanger means 222 each comprises a tube 224 of platinum or heat-resistant material projecting through the side walls of the respective bushing block 216, 218 and having an enlarged medial portion 226 disposed within the bushing block 216 and projecting across the flow opening of the block 216. That portion 226 of the tube 224 internally of the bushing block is provided with an internal liner 228 of alumina or the like material to rigidify the tube portion 226. The alumina tube 228 has an interior passage 230 accommodating the flow of heat exchange fluid, such as air, introduced thereinto through the tube 224. The flow passage 230 and the tube 224 communicates with an air inlet line 232 through an air flow control valve mechanism 234 for accommodating the flow of air from the supply tube 232 through the tube 224 and the liner passage 230 to exit through an air outlet 236 which is vented to an appropriate exhaust means.

As best shown in FIG. 5, the intermediate bushing block 216 contains a pair of vertically spaced, laterally offset rows of heat exchangers 222, and the lower bushing block 218 contains a single row of such heat exchange elements 222. It will be appreciated that specific arrangements and constructions illustrated in FIGS. 4, 5 and 6 may be varied.

Additionally, the bottom 203 of the furnace is cooled by a heat exchanger 240 in flatwise contact therewith and receiving a coolant fluid, such as water, through an inlet 222 and discharging the coolant fluid through an outlet 244.

The operation of the furnace illustrated in FIGS. 4, 5 and 6 is substantially the same as the operation of the furnaces of the embodiments of FIGS. 1, 2 and 3, as heretofore explained, with the heat pattern internally of the furnace being substantially identical to that of the previously described embodiments and having generally the characteristics illustrated in FIGS. 7-11.

The superimposed rows of heat exchanger tubes 224 are interposed in the path of flow of the molten glass through the bushing blocks 214, 216 and 218 and serve to more efficiently extract heat from the molten glass and to prevent "channeling" of hot glass from the overlying pool of glass 207. In FIG. 11 of the drawings, the effect of "over-chilling" of the sides of the bushing blocks can be seen. By cooling the glass flowing through the center of the bushing blocks by means of the heat exchangers 222, the effect of FIG. 11 can be avoided and more heat can be extracted without "channeling".

Figure 9:
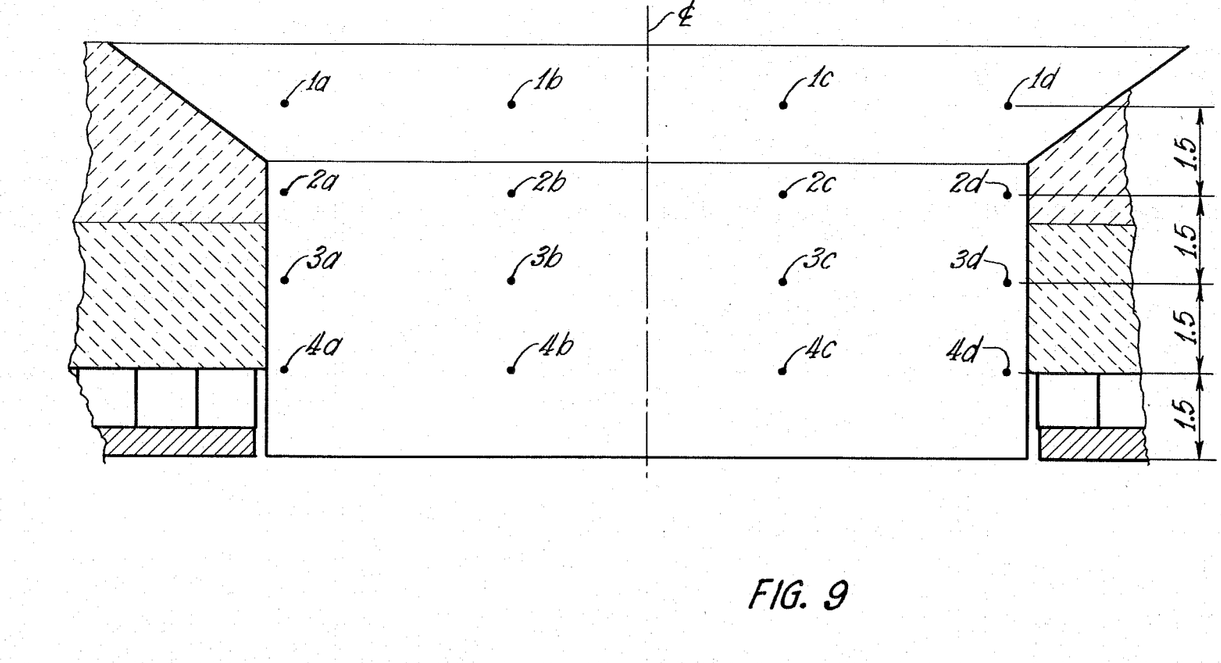
FIG. 9 is a diagrammatic representation of the location at which various thermocouple temperature determinations were made in a furnace constructed in accordance with FIG. 3.

Because of the presence of the heat exchangers 222 in the bushing blocks 216 and 218, it has so far been impossible to determine a temperature profile of the glass flowing through the blocks, as such a temperature profile is presented in FIGS. 9, 10 and 11. However, it has been determined that the utilization of the heat exchangers 222 makes possible an increase in throughput from the furnace 200 as compared to the furnaces of FIGS. 1 through 3. For example, in a furnace having a maximum furnace temperature of 2750° F. utilizing 12-15 gallons per minute of water through the heat exchanger 240 and a typical air flow of 15 standard cubic feet per hour through the heat exchangers 222 having tubes of 3/8" internal diameter, throughput was increased by 80%.

The following examples present data obtained from actual operation and are presented as exemplary of the results to be obtained by practicing the methods of the present invention utilizing the apparatus herein disclosed.

EXAMPLE I

A furnace as disclosed in FIG. 3 was operated under the following conditions.

| Depth of glass over well | 9" |
| Depth of glass over the bushing | 16" |
| Glass pull (average) | 50 lbs/hr |
| Melter bottom cooling | 1.8 gal/min |

A temperature profile was determined by measurements taken by thermocouples immersed manually through the batch layer to the indicated depth within the furnace as it was operating. Measurements were taken consecutively on the furnace centerline and at either end near the end wall. The feeding of particulate batch was interrupted during electrode insertion, temperature measurement and electrode removal. The interruption of batch feeding varied the batch thickness from normal which varied the heat loss upwardly through the batch layer as reflected in the temperature measurement at the top region of the furnace, at the 9" level. Further, the temperature measured at the centerline at the 0 level and at the next level were increased because the side wall locations were cooled by the refractory furnace bottom while the centerline location was not so cooled.

The following readings were obtained:

| Distance Above Inlet to Bushing Well (inches) | Measurement Location and Temperature (Degrees F.) | | |
|---|---|---|---|
| | South End | Centerline | North End |
| 0 | 2604 | 2704 | 2560 |
| 1.5 | 2649 | 2722 | 2640 |
| 3.0 | 2703 | 2731 | 2698 |
| 4.5 | 2762 | 2738 | 2708 |
| 6.0 | 2817 | 2811 | 2808 |
| 7.5 | 2834 | 2809 | 2824 |
| 9.0 | 2559 | 2723 | 2738 |

The temperature measurements demonstrate:
1. The occurrence of substantially isothermal zones of molten glass occurring at vertically spaced locations in the furnace.

2. The occurrence of the greatest temperature in the furnace at and above the electrode level (levels 6" and 7.5").

3. The progressive cooling of the glass in isothermal zones beneath the electrode level.

4. The effect of heat loss through the batch layer when it is less than normal.

EXAMPLE II

The furnace was operated as set forth above, but thermocouple measurements were taken along the centerline of the furnace at the indicated distance above the bushing. The technique of thermocouple measurements was as described in Example I. The bushing was operated at a set point of 2300°–2350° F.

The results obtained are plotted in the graph of FIG. 7.

EXAMPLE III

The furnace as illustrated in FIG. 3 was operated and measurements taken as described in Example II, but the conditions were varied as follows.

| | |
|---|---|
| Depth of glass over well | 9" |
| Dimension from top of bushing to glass height | 16" |
| Glass pull (average) | 27 lbs/hr |
| Melter bottom cooling | 1.5 gal/min |

Centerline thermocouple measurements were taken as above explained, and the results are plotted in the graph of FIG. 8.

EXAMPLE IV

To obtain a temperature profile in the bushing well, the furnace was operated at a fixed throughput of 50 lbs/hr, a melter maximum temperature of 2843° F. and at bottom cooling of 3.6 gal/min. Thermocouple measurements were taken manually through the top of the furnace at the locations indicated in FIG. 9 of the drawings.

The following results were obtained:

| Distance Above-Bushing | Location and Temperature | | | |
|---|---|---|---|---|
| 6" | 1(a) 2790° | 2(b) 2793° | 1(c) 2783° | 1(d) 2800° |
| 4.5" | 2(a) 2725° | 2(b) 2741° | 2(c) 2730° | 2(d) 2728° |
| 3" | 3(a) No Reading | 3(b) 2650° | 3(c) 2671° | 3(d) 2645° |
| 1.5" | 4(a) 2518° | 4(b) 2574° | 4(c) 2566° | 4(d) 2545° |

These results are plotted in FIG. 10 of the drawings.

EXAMPLE V

To determine the effect of increased water cooling, the furnace of Example IV was operated at the following conditions:

| | |
|---|---|
| Glass Pull | 50 lbs/hr |
| Melter bottom cooling | 10.2 gal/min. |
| Melter maximum temperature | 2825° F. |

The glass temperature was measured at a level 1.5 above the bushing at three locations corresponding to locations 4(a), 4(b) and 4(c) above. The thermocouple at the location 4(d) malfunctioned and no measurements were obtained at that level.

The results are plotted in FIG. 11 of the drawings and are compared therein with the results at the same locations as determined in Example IV.

INDUSTRIAL APPLICABILITY

An electric furnace in accordance with this invention was hung in position beneath a batch feed system. Four electrodes were employed in the melter. They extended through side walls and were arranged as pairs of opposed, parallel electrodes. The electrodes were movable and could penetrate into the furnace until the tips of opposed electrodes are only one inch apart. A production platinum bushing was installed below the melter with a refractory bushing block in place.

Generally, the temperature of the molten material at the bushing will be at least 300° F. lower than the temperature of the molten material at the batch interface. This difference may, however, be as high as 650° F. depending upon the type of material being melted and furnace conditions. On occasion, the difference may be less than 300° F. However, this condition would not be encountered often.

The bushing was a conventional textile bushing used to make continuous fibers. While E glass fibers and C glass fibers were produced, R glass or a basalt also could be made. Melter temperatures usually were above 2700° F. (1482° C.) and typically were about 2750° F. (1510° C.). Bushing temperatures usually were above 2100° F. (1149° C.) and typically were about 2200° F. (1204° C.).

Precautions of isolating the electrodes and grounding the power supply must be taken. Protecting the bushing and melter walls from short circuiting also must be provided. Otherwise, an electrolytic effect will be established between the grounded molybdenum electrodes, the platinum bushing grounded through the refractory and the molten glass. This battery-like effect will cause premature failure of the melter, usually through corrosion of the platinum bushing. By applying a source of direct current to the bushing with one lead to the bushing and the other to ground, this effect can be eliminated. The anodic protection of forming means, such as bushings or feeders, for making glass fibers is accomplished by applying an anodic D.C. bias to a bushing which has been electrically grounded. This grounding can even occur through the refractory. While anodic protection is described in terms of a grounded bushing, any portion of the melter, such as thermocouple or electrode made of precious metal, may be grounded in a similar manner. Also, there must be a cathodic material somewhere in the vicinity of the bushing to complete the D.C. circuit. The molybdenum electrodes of the melter often may serve the purpose of completing the D.C. circuit and acting as the cathode.

At start-up, the electrodes were spaced apart so that opposed tips were about 3 inches apart at the center of the furnace. During normal operation, the electrodes were backed out depending upon furnace conditions. Generally, opposing electrodes were about 4 to 5 inches apart during normal fiber forming conditions.

The distance between electrodes also is dependent upon the refractory. The electrodes are spaced to minimize short-circuiting through the refractory. The electrodes are spaced so that the resistance between electrodes is less than the resistance between electrodes through refractory walls. One structure for doing this may be spaced apart opposed electrodes within a vessel, wherein the electrodes consist of a first row of spaced apart electrodes and a second row of spaced apart electrodes, the second row being opposed to the first row and the electrodes from one row extending to terminate in spaced apart, generally aligned relationship with the electrodes from the other row. In one embodiment, adjacent electrodes in a row have a lateral distance between them, wherein the electrodes at the end of each row have a lateral distance between them and the adjacent interior surface that is one-half the lateral distance between adjacent electrodes in that row.

The distance between the electrodes and the forming means also is important because there must be enough heat loss so that the forming means, e.g., a bushing, will operate. The heat loss can be easily adjusted with the electrodes of this invention to conform to the throughput of the furnace. In conventional unit melters with heater strips, only forming speeds or batch feeding could be adjusted in response to varying temperatures in the melter or forming means.

In conventional horizontal furnaces, it is difficult to get good heat patterns in the forehearth. Cold glass flows along the bottom of the forehearth with the hot glass rising to the top. With the unit melter of this invention, there is no molten flow in the axial direction. The flow is vertical with more uniform glass temperature to the forming means.

In conventional unit melters, the flow is merely downward beyond the heater strips. The spaced apart opposed electrode and controlled current flow of this invention heat by joule effect to provide molten material of uniform temperature to produce forming outlets located at the bottom of the melter. The spaced apart opposed electrodes and controlled current flow also establish an essentially isothermal condition across a given horizontal plane in the melter. These temperature gradients allow molten material to be formed directly from the melter without further processing.

The above runs were carried out with a single bushing below the melter. Multiple bushings also may be utilized on a single melter. In one embodiment, the electrodes may be inserted in the side walls of the forehearth thereby eliminating need for the large horizontal furnace and fining channel. This would eliminate any horizontal or lateral flow of molten material and provide a vertical flow of molten material to the forming means. Eliminating lateral flow prevents any interaction between bushings.

One arrangement for carrying out this embodiment includes multiple openings in the floor for discharge of molten material therethrough with a forming means disposed at each opening to receive molten material discharged from the vessel.

We claim:
1. In a method of melting glass in a melting furnace confining a pool of molten glass above a furnace bottom wall and having means for depositing a layer of unmelted particulate glass batch on the surface of the pool and also having heating electrodes immersed in the pool of molten glass and located at a vertically medial portion of said pool, the steps of:
 a. heating the pool of molten glass by said electrodes to form an isothermal layer of molten glass;
 b. circulating heated glass upwardly from the electrode location to melt the batch layer;
 c. returning most of the glass back to the electrode location for reheating while flowing a portion of the glass downwardly beyond the electrode location;
 d. that glass located beneath the electrodes flowing downwardly in said pool and through a vertical outlet passage directly into a forming apparatus underlying the pool as glass is withdrawn through said forming apparatus; and
 e. flowing a heat exchange medium through a heat exchanger located above the forming apparatus in heat exchange relation (a) with the furnace bottom wall and (b) with the downwardly flowing glass in said outlet passage in a manner to cool the molten glass in successive, essentially isothermal layers, the glass issuing from said passage being at a substantially uniform temperature which is conducive to forming in said forming apparatus.

2. In a method of melting glass in a melting furnace confining a pool of molten glass and having means for depositing a layer of unmelted particulate glass batch on the surface of the pool and also having a plurality of heating electrodes immersed in the pool of molten glass and located at a vertically medial portion of said pool, the steps of:
 a. heating the pool of molten glass by said electrodes to circulate heated glass upwardly from the electrodes to melt the batch layer with most of the circulated glass returning to the electrodes for reheating, and the remainder of the circulated glass flowing beneath the electrodes downwardly in said pool and through a vertical outlet passage directly into a a forming apparatus underlying the pool; and
 b. flowing a heat exchange fluid through a plurality of heat exchange tubes immersed in the molten glass within said lower passage to cool the molten glass to a temperature conducive to forming in said forming apparatus.

3. A method of melting glass and supplying molten glass from a melting furnace directly into a fiberizing bushing by the steps of:
 a. forming in said furnace a pool of molten glass having a layer of particulate, unmelted glass batch at its upper surface and communicating directly through a vertical lower passage in the furnace lower wall with a fiberizing bushing, said lower passage and said bushing being of substantially the same cross-sectional area;
 b. heating the molten glass body by a plurality of heating electrodes immersed in the pool intermediate said batch layer and said passage to circulate glass upwardly from the electrodes toward the glass batch and then downwardly to the electrodes, some of the glass passing downwardly past the electrodes and through the passage to the fiberizing bushing; and
 c. flowing a fluid heat exchange medium through a heat exchanger located on an exterior surface of the furnace lower wall, the flow of the medium being sufficient (1) to cool that glass located beneath the electrodes in successively cooler essentially isothermal planes and (2) to cool the glass issuing from said passage directly into said fiberizing bushing to a substantially uniform temperature conducive to fiberization across the entire cross-sectional area of said passage.

4. A glass melting furnace for supplying molten glass to a fiberizing bushing comprising a refractory enclosure for a pool of molten glass overlying a central outlet passage directly vertically communicating with and fully opening into the bushing, heating electrodes immersed in the pool of molten glass, and fluid-cooled heat exchange means immersed in the molten glass in said passage to cool the glass in successive substantially isothermal planes to a temperature conducive to fiberization as it flows downwardly through said passage into said bushing.

5. A furnace as defined in claim 4, wherein the heat exchange means is a plurality of conduits traversing said passage and means for flowing a cooled heat exchange fluid through said conduits.

6. A furnace as defined in claim 4, wherein the heat exchange means is in heat exchange relation with that portion of said refractory enclosure underlying said pool.

7. A method of melting glass by the steps of forming a pool of molten glass overlying a bottom wall having a central outlet passage directly vertically communicating with a lower forming apparatus, maintaining a layer of particulate unmelted glass batch on the surface of said pool, heating the pool to form an isothermal zone intermediate said outlet and said batch layer, flowing heated glass downwardly in the pool and through said passage in successively cooler isothermal zones and flowing a fluid heat exchange medium in heat exchange relation to the downwardly flowing glass to cool the glass in said isothermal zones in said passage to an extent such that the glass issuing from said passage and supplied to the forming apparatus is at a temperature conducive to forming.

8. A method of melting glass by the steps of forming a pool of molten glass overlying a central outlet passage directly vertically communicating with a forming apparatus, maintaining a layer of particulate unmelted glass batch on the surface of said pool, heating the pool intermediate said outlet and said batch layer, flowing heated glass downwardly in the pool and through said passage in successively cooler isothermal zones traversed by a plurality of spaced conduits, and flowing a fluid heat exchange medium through said conduits and into heat exchange relation to the downwardly flowing glass to cool the glass in essentially isothermal layers to an extent such that the glass supplied to the forming apparatus is at a temperature conducive to forming.

9. In a method of melting glass and of supplying molten glass at a uniform desired temperature to a fiberizing apparatus capable of sustained glass throughput during fiberization, the steps comprising:

(1) providing a body of molten glass beneath a particulate batch layer and above an outlet passage opening communicating directly with the fiberizing apparatus;

(2) heating the glass body to form a hot, substantially isothermal layer of molten glass in said body beneath the batch layer;

(3) the heating step (2) being carried out by a plurality of electrodes located in said isothermal layer and electrically energized to flow molten glass from said layer upwardly into contact with the undersurface of said batch layer;

(4) that glass contacting said batch layer being cooled by such contact;

(5) the cooled glass being primarily recirculated back to the isothermal layer for reheating and recirculation;

(6) a portion only of the glass of said isothermal layer being withdrawn downwardly by the throughput of the fiberizing apparatus in a manner to maintain the glass in successive, substantially isothermal layers of progressively decreasing temperature; and (7) the molten glass entering the fiberizing apparatus at a substantially uniform temperature conducive to fiberization.

10. In a method of melting glass and of supplying molten glass at a uniform desired temperature to a forming apparatus capable of continuous, sustained glass throughput, the steps of providing a body of molten glass surmounted by a particulate batch layer, the glass body overlying an outlet passage opening directly into the forming apparatus, and flowing molten glass through said body and said outlet passage in substantially isothermal layers extending substantially horizontally across substantially the entire extent of said body and said passage both above and below a median plane, said last named step being carried out by (a) heating the body of glass by a plurality of electrodes at said median plane to produce a substantially isothermal layer of glass, said electrodes inducing sufficient localized convection flow at the median plane to circulate glass upwardly from said isothermal layer toward the undersurface of the batch layer, (b) cooling the upwardly circulating glass by its contact with the batch layer to form a cooler isothermal layer from which glass recirculates back to the median plane for reheating, and (c) withdrawing from said cooler layer an amount of glass substantially equal to the throughput of the forming apparatus, the withdrawn glass passing downwardly beyond the median plane in a manner to maintain the glass in successive substantially isothermal layers of decreasing temperature so that the glass enters said forming apparatus at a substantially uniform temperature conducive to forming.

* * * * *